March 8, 1927.
S. LEWIS
1,620,112
SHOCK ABSORBER FOR VEHICLES
Filed Jan. 12, 1926
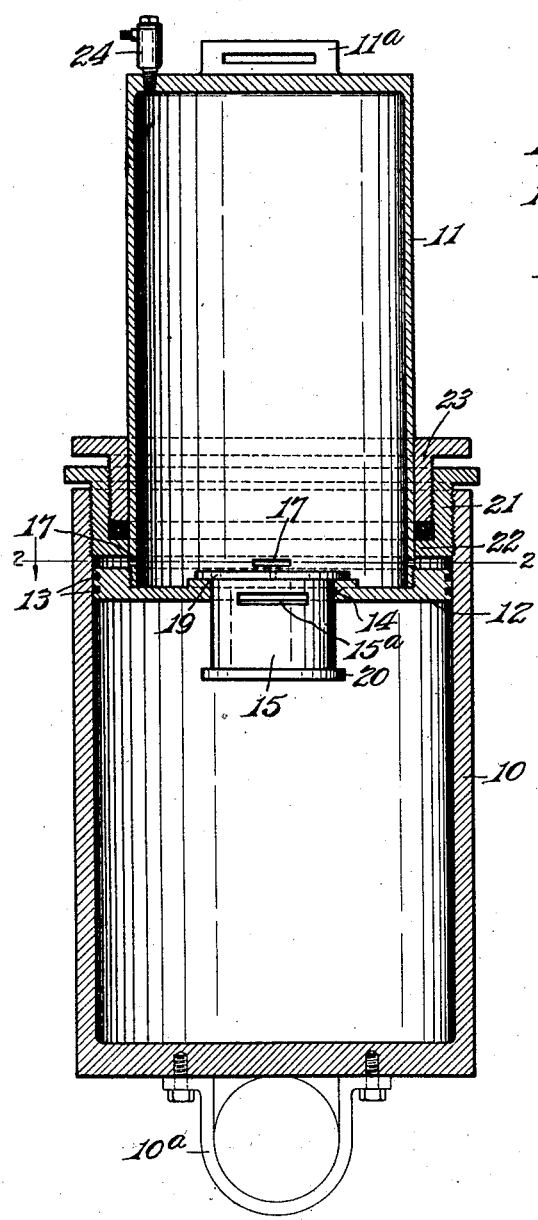
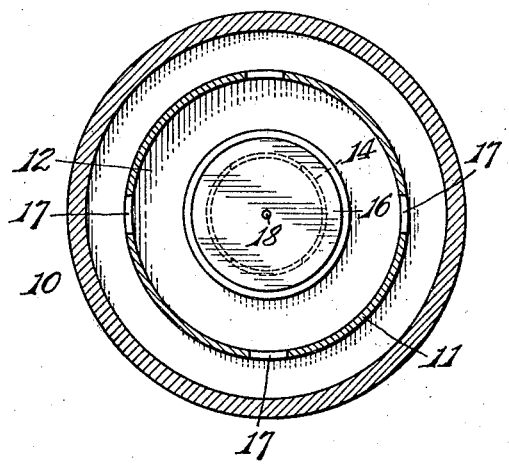
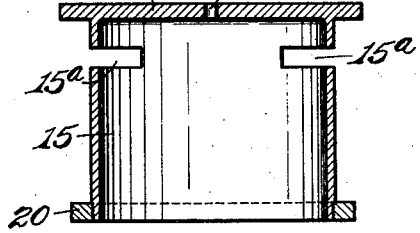
INVENTOR
Stephen Lewis
N. E. Dunlap
ATTORNEY Patented Mar. 8, 1927.

UNITED STATES PATENT OFFICE.

STEPHEN LEWIS, OF MARTINS FERRY, OHIO.

SHOCK ABSORBER FOR VEHICLES.

Application filed January 12, 1926. Serial No. 80,799.

This invention relates to an improved shock absorber for motor vehicles and contemplates improved details of construction and arrangement of parts.

The device comprises in general two fluid containing members, one connected to the axle of the vehicle and the other connected to a suitable part of the body frame, these members being relatively movable and being designed, as is generally the case with devices of this kind, to take up or check shocks which would otherwise be imparted to the vehicle chassis. The two relatively movable members are connected by a valve device for permitting the transfer of fluids therebetween at proper times, as will hereinafter appear.

For a complete understanding of the invention reference is to be had to the accompanying drawings forming a part of this specification in which—

Figure 1 is a longitudinal sectional view of the shock absorbing device;

Figure 2 is a section on line 2—2, Fig. 1; and—

Figure 3 is a detail section of the fluid transfer valve.

Referring to the drawings, the reference character 10 designates a hollow cylinder adapted to be attached, as by a shackle 10ª, to the axle of a vehicle, and 11 designates a piston-like member of hollow cylinder form provided at its outer end with a slotted lug 11ª or other suitable part for attaching the cylinder 11 to the vehicle body. The cylinder 11 is closed at its upper, or outer, end and is provided at its lower, or inner, end with a threaded on piston head 12 having suitable means, as sealing rings 13, for forming a fluid tight seal with the walls of the cylinder 10. The piston head 12 has therein a central opening 14 and has operatively mounted in said opening an upright movable valve 15. Said valve, which is of hollow cylindrical form, is provided with a closed upper end 16 having therein a small opening or port 18 and has an annular flange 19 which, in the seated position of the valve, rests upon the piston head 12. The lower end of the valve 15 is open, as shown, and carries a detachable ring or flange member 20. One or more ports 15ª are provided in the cylindrical wall of the valve at a suitable distance from the seating flange 19.

The cylinder 11 is disposed slidably within the upper end of the cylinder 10, a reducing ring 21 being threaded within an end of said cylinder 10 and having at its lower end an internal annular flange 22 which closely embraces said cylinder 11. A packing gland 23 threaded within the neck portion of said reducing ring provides a fluid tight joint between said reducing ring 21 and said casing 11. The casing 11 has therein a plurality of ports 17 located annularly thereof at regularly spaced intervals adjacent to the piston head 12.

The cylinder 10 is preferably filled with oil, while the cylinder 11 preferably carries air under pressure. The air may be introduced within the cylinder 11 through any suitable form of one-way valve, or check valve, indicated at 24.

It will be understood that when the cylinders are actuated toward each other, as by a road shock, a pressure is created which causes the oil within the cylinder 10 to act upon the under side of the top of the valve 15 whereby the latter is lifted from its seat upon the head 12, thereby uncovering the ports 15ª, which latter then permit oil to enter the cylinder 11 against the therein-contained air pressure, whereby the impact of the shock is effectively cushioned. Furthermore, as the cylinders 10 and 11 relatively approach, oil passes outward through the ports 17 in the cylinder 11 to the annular space between the downwardly facing shoulder formed by the flange 22 and the opposed annular portion of the top surface of the piston head 12, gradually relieving the substantial vacuum, which, except for the last mentioned ports, would exist in said space. When the initial shock is relieved and the recoil movement commences, the valve 15 is almost instantly returned to its seated position, whereupon return of oil to the cylinder 10 from the cylinder 11 is effected wholly through the upper port 18, which, being of restricted capacity, permits the return of the oil very gradually, and thus the velocity of the recoil movement is retarded. The recoil movement is further retarded, or cushioned, by the small amount of oil which is contained in the annular space or chamber between the flange 22 and the opposed portion of the top of the piston head 12, and which is gradually returned to the interior of the cylinder through the ports 17.

While I have shown and described a specific embodiment of the invention which

I consider to be a preferred form thereof, it will be understood that the showing is illustrative and that I may resort to changes in details of construction and arrangement of parts without departing from the invention defined by the appended claims.

What is claimed is—

1. A shock absorbing device comprising two relatively movable fluid-containing members having their outer ends closed, and a valve intermediate said members for permitting the automatic transfer of fluid from one member to the other according to the direction of relative movement, said valve controlling a sole means of communication between said members being adapted to permit a more rapid transfer in one direction than the other.

2. A shock absorbing device comprising a cylinder, a reducing ring having a flange, a cylinder slidable in said reducing ring, a piston head secured to said slidable cylinder below the flange of said reducing ring, and a shiftable valve mounted in said piston head.

3. A shock absorbing device comprising two relatively movable fluid-containing cylinders, one of said cylinders having an end fitted within an end of the other, said one cylinder having a piston head at its inner end and the other cylinder having a shoulder near its inner end, and a valve mounted in said piston head controlling the passage of fluid between said cylinders, said valve permitting such passage more rapidly in one direction than the other.

4. A shock absorbing device comprising two relatively movable fluid containing cylinders, one of said cylinders having a piston head fixed thereto and having a valve mounted for movement in said piston head, said valve having ports adapted to be covered and uncovered, said valve ports being arranged to permit flow of fluid therethrough more rapidly in relatively approaching than separating movements of said cylinders.

5. A shock absorbing device comprising a cylinder, a second cylinder slidable relatively to the first cylinder, a piston head carried by said second cylinder and slidable within the first cylinder, said piston head having an opening therethrough and provided with a valve seat, a valve slidable in said opening and provided with a portion for seating upon said valve seat, said valve having closeable ports in the walls thereof for permitting communication between said cylinders and also having an unclosable port of limited capacity in the face thereof.

6. A shock absorbing device comprising a cylinder having at its inner end a reducing ring with a shoulder thereon, a cylinder slidable within and in fluid tight relation to said ring, a piston head at the inner end of the last mentioned cylinder, said cylinder having ports in the walls thereof adjacent to said piston head, said piston head having an opening therethrough, a valve shiftable in said opening and having ports adapted to be covered and uncovered as it moves to and from seated position with respect to said piston head, said piston head having an annular portion forming a fluid tight joint with the first mentioned cylinder, the ports in the second cylinder providing restricted communication between the interior of said second cylinder and the annular space formed intermediate said shoulder and said annular portion of the piston head.

In testimony whereof, I affix my signature.

STEPHEN LEWIS.